(12) United States Patent
Broers et al.

(10) Patent No.: US 8,302,763 B2
(45) Date of Patent: Nov. 6, 2012

(54) APPARATUS AND METHOD FOR BUFFERING PRODUCTS

(75) Inventors: Johannes Wilhelmus Broers, Oosterblokker (NL); Jozef Walter Maria Hopman, Huizen (NL); Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 251 days.

(21) Appl. No.: 12/598,692

(22) PCT Filed: May 7, 2008

(86) PCT No.: PCT/NL2008/050273
§ 371 (c)(1),
(2), (4) Date: Nov. 3, 2009

(87) PCT Pub. No.: WO2008/136673
PCT Pub. Date: Nov. 13, 2008

(65) Prior Publication Data
US 2010/0140054 A1 Jun. 10, 2010

(30) Foreign Application Priority Data
May 7, 2007 (NL) ...................................... 2000635

(51) Int. Cl.
*B65G 47/51* (2006.01)
(52) U.S. Cl. ........ 198/778; 198/406; 198/407; 198/408; 198/607
(58) Field of Classification Search ............. 198/406, 198/407, 408, 778
See application file for complete search history.

(56) References Cited

U.S. PATENT DOCUMENTS

| 1,910,241 | A |   | 5/1933  | Chapman |
|-----------|---|---|---------|---------|
| 3,983,989 | A |   | 10/1976 | Wahren  |
| 4,413,724 | A |   | 11/1983 | Fellner |
| 4,653,631 | A | * | 3/1987  | Heybourn et al. ............ 198/778 |
| 4,893,708 | A | * | 1/1990  | Machacek ...................... 198/778 |
| 4,944,162 | A | * | 7/1990  | Lang et al. ...................... 62/380 |
| 5,105,934 | A | * | 4/1992  | Cawley ......................... 198/778 |
| 5,191,267 | A | * | 3/1993  | Machacek ....................... 318/67 |
| 5,259,302 | A | * | 11/1993 | Chen .............................. 99/405 |
| 5,291,987 | A |   | 3/1994  | Zink    |
| 5,335,590 | A | * | 8/1994  | Crump et al. .................. 99/479 |

(Continued)

FOREIGN PATENT DOCUMENTS

DE 3444132 6/1986

(Continued)

OTHER PUBLICATIONS

International Search Report of the European Patent Office Patent Office in counterpart foreign application No. PCT/NL2008/050273 filed May 7, 2008.

(Continued)

*Primary Examiner* — Douglas Hess
(74) *Attorney, Agent, or Firm* — Steven M. Koehler; Westman, Champlin & Kelly, P.A.

(57) ABSTRACT

An apparatus for buffering products comprises at least three buffer conveyors arranged in series, which can be driven independently of each other, a first buffer conveyor which can be connected to supply device for supplying products and a last buffer conveyor which can be connected to discharge device for discharging the products, wherein the buffer conveyors are so arranged that each of the products follows the same conveying path and that at least one of the buffer conveyors comprises a spiral path.

19 Claims, 5 Drawing Sheets

U.S. PATENT DOCUMENTS

| | | | |
|---|---|---|---|
| 5,348,436 A | | 9/1994 | Hogenkamp et al. |
| 5,413,213 A | | 5/1995 | Golz |
| 5,447,223 A | * | 9/1995 | Dasqupta .................... 198/778 |
| 5,490,589 A | | 2/1996 | Golz |
| 5,664,661 A | | 9/1997 | Maier |
| 5,772,005 A | | 6/1998 | Hansch |
| 5,833,045 A | | 11/1998 | Osti |
| 5,974,682 A | * | 11/1999 | Akimoto ........................ 34/66 |
| 6,016,904 A | | 1/2000 | Hammock |
| 6,065,463 A | * | 5/2000 | Martin ........................ 126/21 A |
| 6,092,641 A | | 7/2000 | Draghetti |
| 6,206,947 B1 | | 3/2001 | Evans |
| 6,241,074 B1 | | 6/2001 | Steeber |
| 6,244,168 B1 | * | 6/2001 | van de Vorst et al. ........ 99/443 C |
| 6,371,275 B1 | * | 4/2002 | Terrell et al. .................. 198/367 |
| 6,394,261 B1 | * | 5/2002 | DeGennaro .................... 198/815 |
| 6,523,677 B1 | | 2/2003 | DeGennaro et al. |
| 6,658,993 B2 | * | 12/2003 | Kuenen ............................ 99/446 |
| 6,666,322 B2 | | 12/2003 | Biondi et al. |
| 6,725,674 B1 | * | 4/2004 | Kamm et al. ...................... 62/63 |
| 6,725,998 B2 | | 4/2004 | Steeber et al. |
| 7,032,742 B2 | | 4/2006 | Hartness et al. |
| 7,107,899 B2 | * | 9/2006 | Nothum, Jr. ................. 99/443 C |
| 7,163,099 B2 | | 1/2007 | Mueller |
| 7,165,670 B2 | | 1/2007 | Shefet et al. |
| 7,191,896 B2 | | 3/2007 | Hartness et al. |
| 7,240,788 B2 | * | 7/2007 | Belz et al. ...................... 198/778 |
| 7,252,189 B2 | | 8/2007 | Yagi |
| 7,299,589 B2 | | 11/2007 | Campbell et al. |
| 7,331,445 B2 | * | 2/2008 | Roland .......................... 198/778 |
| 7,374,392 B2 | * | 5/2008 | Biondi et al. .............. 414/795.1 |
| 7,775,344 B2 | | 8/2010 | Balk |
| 2006/0131139 A1 | | 6/2006 | Olsson |
| 2008/0308386 A1 | | 12/2008 | Balk |
| 2010/0096243 A1 | | 4/2010 | Balk |
| 2011/0259711 A1 | | 10/2011 | Broers |

FOREIGN PATENT DOCUMENTS

| | | |
|---|---|---|
| DE | 10312695 | 10/2004 |
| DE | 102004007590 | 9/2005 |
| DE | 102006025520 | 12/2007 |
| EP | A 0538742 | 4/1993 |
| EP | 0635414 | 6/1994 |
| EP | 0814038 | 12/1997 |
| EP | A 1389595 | 2/2004 |
| EP | 1534614 | 6/2005 |
| EP | 2039626 | 3/2009 |
| FR | 2769010 | 4/1999 |
| GB | 1084200 | 8/1917 |
| GB | 170321 | 10/1921 |
| GB | 1321396 | 2/1972 |
| GB | 2104030 | 3/1983 |
| GB | 2109765 | 6/1983 |
| GB | A 2129754 | 5/1984 |
| JP | 07033241 | 2/1995 |
| JP | 07157058 | 6/1995 |
| NL | 7101881 | 2/1971 |
| WO | WO 2007/067049 | 6/2007 |
| WO | WO 2007064659 | 6/2007 |
| WO | WO 2008136673 | 11/2008 |
| WO | WO 2009005349 | 1/2009 |
| WO | WO 2010/130716 | 11/2010 |

OTHER PUBLICATIONS

Official Search Report of the European Patent Office Patent Office in application No. PCT/NL2006/000628 filed Dec. 8, 2006.

Written opinion of the European Patent Office Patent Office application No. PCT/NL2006/000628 filed Dec. 8, 2006.

Broers, U.S. Appl. No. 13/123,796, filed Apr. 12, 2011, A Buffer Conveyor Having Parallel Tracks.

European Patent Office in application No. PCT/EP2009/063518 filed Oct. 15, 2008.

Official Search Report of the European Patent Office Patent Office in application No. PCT/NL2007/050695 filed Dec. 21, 2007.

Written opinion of the European Patent Office Patent Office in application No. PCT/NL2007/050695 filed Dec. 21, 2007.

Written Opinion of the European Patent Office Patent Office in counterpart foreign application No. PCT/NL2008/050273 filed May 7, 2008.

AmbaFlex: "SpiralVeyor SVX-DL" Sep. 26, 2008, XP002570630 Retrieved from the Internet: URL:http://www.ambaflex.com/assets/www.AmbaFlex.com/downloadables/SpiralVeyor/leaflet_SVX-DL_en.pdf.

European Search Report and Written Opinion of the European Patent Office Patent Office in foreign application No. PCT/ EP2010/056424 filed May 11, 2010.

Preliminary Amendment of U.S. Appl. No. 13/320,093, filed Nov. 11, 2011, which is a national stage filing of PCT/EP2010/056424 filed May 11, 2010 (published as WO 2010/130716).

Restriction Requirement for U.S. Appl. No. 12/520,794, filed Aug. 21, 2009, mailed Dec. 16, 2011, pp. 1-5.

Office Action for U.S. Appl. No. 12/520,794, filed Aug. 21, 2009, mailed Mar. 13, 2012, pp. 1-8.

* cited by examiner

APPARATUS AND METHOD FOR BUFFERING PRODUCTS

CROSS-REFERENCE TO RELATED APPLICATION

The present application is a national stage filing of International patent application Serial No. PCT/NL2008/050273, filed May 7, 2008, and published as WO 2008/136673 in English.

BACKGROUND

The discussion below is merely provided for general background information and is not intended to be used as an aid in determining the scope of the claimed subject matter.

Aspects of the invention relate to an apparatus for buffering products, comprising at least three buffer conveyors arranged in series, which can be driven independently of each other, a first buffer conveyor of which can be connected to a supply device for supplying products and a last buffer conveyor which can be connected to a discharge device for discharging the products.

Such an apparatus is known from EP 0 538 742 B1. The known apparatus has an input station and an output station, which can be actuated independently of each other. At the input station, the products are received, stopped and transported in upward direction by a support plate on the first conveyor. Then a number of support plates carrying products are simultaneously moved in horizontal direction to a second conveyor. The second conveyor moves the support plates to an end of the second conveyor, where the products are put ready for being transported by a third conveyor. The third conveyor carries the support plates to the output station, where the products are pushed off the support plates. In this arrangement the input station and the output station are functionally disconnected from each other.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An apparatus according to an aspect of the invention includes buffer conveyors each driven by a drivable endless conveyor belt and that said buffer conveyors are so arranged that each of the products follows the same conveying path and at least one of the buffer conveyors comprises a spiral path.

Because each of the products follows the same conveying path, it is not necessary to change the path of the products by a divider or to guide the products into parallel buffering paths by a sliding movement. This is advantageous in particular in the case of products which are not very stable, which products are difficult to transfer between different conveyors in practice, but also in the case of large and/or heavy products, which are difficult to shift because of their frictional resistance with the surface supporting the product. The advantage of the spiral path is that the ratio between the path length of the buffer conveyor and the projected area of the buffer conveyor, seen in the axial direction of the central axis thereof, is large, so that the buffering space is optimally utilized. A spiral path furthermore makes it possible for products being supplied in horizontal direction to be moved in upward direction without needing to be stopped first, as is the case with a vertically moving lift. Because each of the products follows the same conveying path, the apparatus provides a possibility of serial buffering of product collections in the form of "product trains". The terms "first" and "last" buffer conveyor indicate the location along the conveying path of the apparatus where the products pass first and last, respectively, they do not indicate the actual position of the buffer conveyors relative to each other. The term "conveying path" is understood to mean the route followed by the products.

In a practical embodiment of the apparatus, the buffer conveyors jointly comprise a single conveying path, which is made up of each of the endless conveyor belts of the buffer conveyors.

Each buffer conveyor comprises an at least substantially flat drivable support surface for supporting and transporting the products, which support surface is made of a rigid material so as to form a stable surface for the products. In this way the risk of the products falling over during transport is minimized.

In an advantageous embodiment, in order to optimally utilize the spatial advantage of spiral conveyors, the apparatus comprises at least three spiral buffer conveyors.

In a practical embodiment, at least two spiral buffer conveyors are provided, whose central axes extend at least substantially parallel to each other or coincide. In this way it is possible to position the spiral buffer conveyors in a compact manner, for example beside or above each other. Alternatively it is possible to arrange spiral buffer conveyors concentrically relative to each other, so that the space within the conveying path of a buffer conveyor is utilized by a conveyor having a helix with a smaller diameter than that of the enveloping conveyor.

In the case of stacked buffer conveyors, the spiral buffer conveyors adjoin each other in the direction of the central axes thereof. Said stacked-together buffer conveyors need not be two buffer conveyors arranged one after another, seen in the conveying path.

In an advantageous embodiment, each of the buffer conveyors comprises an inlet end and an outlet end, which are connected to the outlet end and the inlet end of the upstream buffer conveyor and the downstream buffer conveyor, respectively, in such a manner that a smooth transition between the buffer conveyors is obtained. This can be achieved, for example, by positioning the outlet end of one buffer conveyor at the same vertical level and in line with the inlet end of a downstream buffer conveyor. Because of the smooth transition, the risk of products falling over upon being transferred from one buffer conveyor to the other buffer conveyor is minimized.

The supply device and/or the discharge device may be a supply conveyor and/or a discharge conveyor, respectively, but it is also conceivable to place products directly on the inlet end of the first buffer conveyor at the location of the supply device and to remove the products directly from the last buffer conveyor at the location of the discharge device. Said placing and removing of the products may be carried out by a person, for example, but preferably it will take place in an automated manner.

An aspect of the invention also relates to a method for buffering products by means of an apparatus which comprises at least three buffer conveyors arranged in series, which are driven independently of each other, a first buffer conveyor which is connected to a supply device for supplying products and a last buffer conveyor which is connected to a discharge device for discharging the products, wherein the method comprises:

receiving a predetermined number of products in series from the supply device on the first buffer conveyor, then discharging said number of products received on the first buffer conveyor in series to a downstream empty buffer conveyor, following that, discharging said number of products in series to a next downstream empty buffer conveyor until said number of products have arrived on the last buffer conveyor, and subsequently discharging said number of products in series from the last buffer conveyor to the discharge device.

Using this method, respective product trains are moved from the supply device to the first buffer conveyor and from the first buffer conveyor, via at least one intermediate conveyor, to the last buffer conveyor, and from the last buffer conveyor to the discharge device. In practice this has been found to be an efficient way of buffering. The fact is that no loose products will "roam" through the apparatus.

In practice the method can be used in such a manner that the first buffer conveyor will not receive any products from the supply device while the number of products received on the first buffer conveyor are being discharged to a downstream empty buffer conveyor. In this case the loading of the first buffer conveyor is not started until it has been emptied. This involves a period of standstill, to be true, but said period can be shortened by increasing the speed at which the products are discharged to the downstream buffer conveyor, which is done by increasing the speed of the first buffer conveyor.

In one embodiment, the first buffer conveyor is driven at least substantially at the same speed while receiving the products as the speed at which the products are being supplied by the supply device, and/or the last buffer conveyor is driven at least substantially at the same speed as the speed at which the products are being discharged by the discharge device. As a result, in particular products which are not very stable are prevented from falling over upon being transferred from one conveyor to the other.

In an alternative method for buffering products, using an apparatus which comprises at least three buffer conveyors arranged in series, which can be driven independently of each other, a first buffer conveyor which is connected to a supply device for supplying products and a last buffer conveyor which is connected to a discharge device for discharging the products, each of the products follows the same conveying path via the buffer conveyors, which conveying path is in part spiral-shaped.

An aspect of the invention also relates to a method for transporting and buffering products by means of an apparatus comprising at least one supply device, a front buffer conveyor, a rear buffer conveyor arranged downstream of said front buffer conveyor, and a discharge device, wherein products are at least substantially continuously transported from the supply device to the front buffer conveyor and from the front buffer conveyor to the rear buffer conveyor, so that a series of products is buffered by the front and/or the rear buffer conveyor, wherein said series of products is at least substantially continuously transported from the rear buffer conveyor to the discharge device within a predetermined period of time, wherein the conveying velocity at the discharge device is higher than the conveying velocity at the supply device, whilst the supply of products from the supply device to the front buffer conveyor continues uninterruptedly while the series of products are being discharged to the discharge device. The advantage of this method is that the supply rate at the supply device and the discharge rate at the discharge device can be significantly different from each other. The discharging of products takes place discontinuously, but the conveying velocity is at least substantially constant and relatively high during the period of time in which said discharging takes place. The supply rate of the products at the supply device is lower, but the supply is continued uninterruptedly, so that sufficient products can be buffered for transporting respective series of products to the discharge device.

The rear buffer conveyor can buffer products with a minimum spacing between them, whilst the front buffer conveyor can allow a larger space between the products.

In one embodiment, the conveying velocity at the first buffer conveyor is increased while a series of products is being discharged to the discharge device. This makes it possible to optimise the discharging process.

Another aspect of the invention also relates to an apparatus for transporting and buffering products, comprising at least one supply device, a front buffer conveyor, a rear buffer conveyor arranged downstream of said front buffer conveyor, and a discharge device, wherein the apparatus is so arranged that, in use, the products are at least substantially continuously transported from the supply device to the front buffer conveyor and from the front buffer conveyor to the rear buffer conveyor, so that a series of products is buffered by the front buffer conveyor and/or the rear buffer conveyor, wherein said series of products is at least substantially continuously transported from the rear buffer conveyor to the discharge device within a predetermined period of time, wherein the conveying velocity at the discharge device is higher than the conveying velocity at the supply device, whilst the supply of products from the supply device to the front buffer conveyor continues uninterruptedly during the discharge of the series of products to the discharge device.

The rear buffer conveyor may be so arranged that the products are buffered with a minimum spacing between them at the rear buffer conveyor. This makes it possible to discharge the products at a high speed to the discharge device.

In a practical embodiment, the front buffer conveyor has a larger buffering capacity than the rear buffer conveyor.

In an embodiment, at least the front buffer conveyor comprises a spiral path, because this leads to an efficient usage of space.

In an alternative, practical embodiment, the apparatus is so arranged that the transport of products from the front buffer conveyor to the rear buffer conveyor is interrupted during the time products are being discharged to the discharge device. As a result, the rear buffer conveyor is first emptied before new products are transported from the front buffer conveyor to the rear buffer conveyor again. During this time the products are only buffered at the front buffer conveyor, because the supply of products to the front buffer conveyor continues uninterruptedly. This process is further facilitated if the front buffer conveyor is a dynamic buffer, so that the products can be buffered with a varying spacing between them.

In this embodiment, the front buffer conveyor may have a smaller buffering capacity than the rear buffer conveyor.

The apparatus may comprise at least a second supply device, a second front buffer conveyor, and a second rear buffer conveyor connected downstream of the second front buffer conveyor, wherein the apparatus is so arranged that, in use, the products are transported at least substantially continuously from the second supply device to the second front buffer conveyor and from the second front buffer conveyor to the second rear buffer conveyor, so that a second series of products is buffered by the second front and/or the second rear buffer conveyor, wherein said second series of products is transported at least substantially continuously from the second rear buffer conveyor to the discharge device within a predetermined period of time, wherein the conveying velocity at the discharge device is higher than the conveying velocity at the second supply device, whilst the supply of products from the second supply device to the second front buffer conveyor continues uninterruptedly during the discharge of the second series of products. The supply device, the front buffer conveyor and the rear buffer conveyor can thus operate independently of the second supply device, the second front buffer conveyor and the second rear buffer conveyor. As a result, the second front and the second rear buffer conveyor can be emptied during the buffering process of the front buffer conveyor and the rear buffer conveyor, for example.

The apparatus can be so arranged that the discharge of the first series of products from the rear buffer conveyor to the discharge device and of the second series of products from the second rear buffer conveyor to the discharge device takes place in time succession, because this makes it possible to alternately discharge a series of products from the supply device and from the second supply device as first and second series.

BRIEF DESCRIPTION OF THE DRAWINGS

Aspects of the invention will be explained in more detail hereinafter with reference to the drawings, which schematically show embodiments of the invention.

DETAILED DESCRIPTION OF THE ILLUSTRATIVE EMBODIMENTS

In the transportation and handling of products, such as the de-palletisation and palletisation of parcel goods, a difference in speed frequently occurs between the supply and discharge of products, so that in practice there is a need for buffering products so as to separate the supply and discharge processes from each other.

Figure 1:
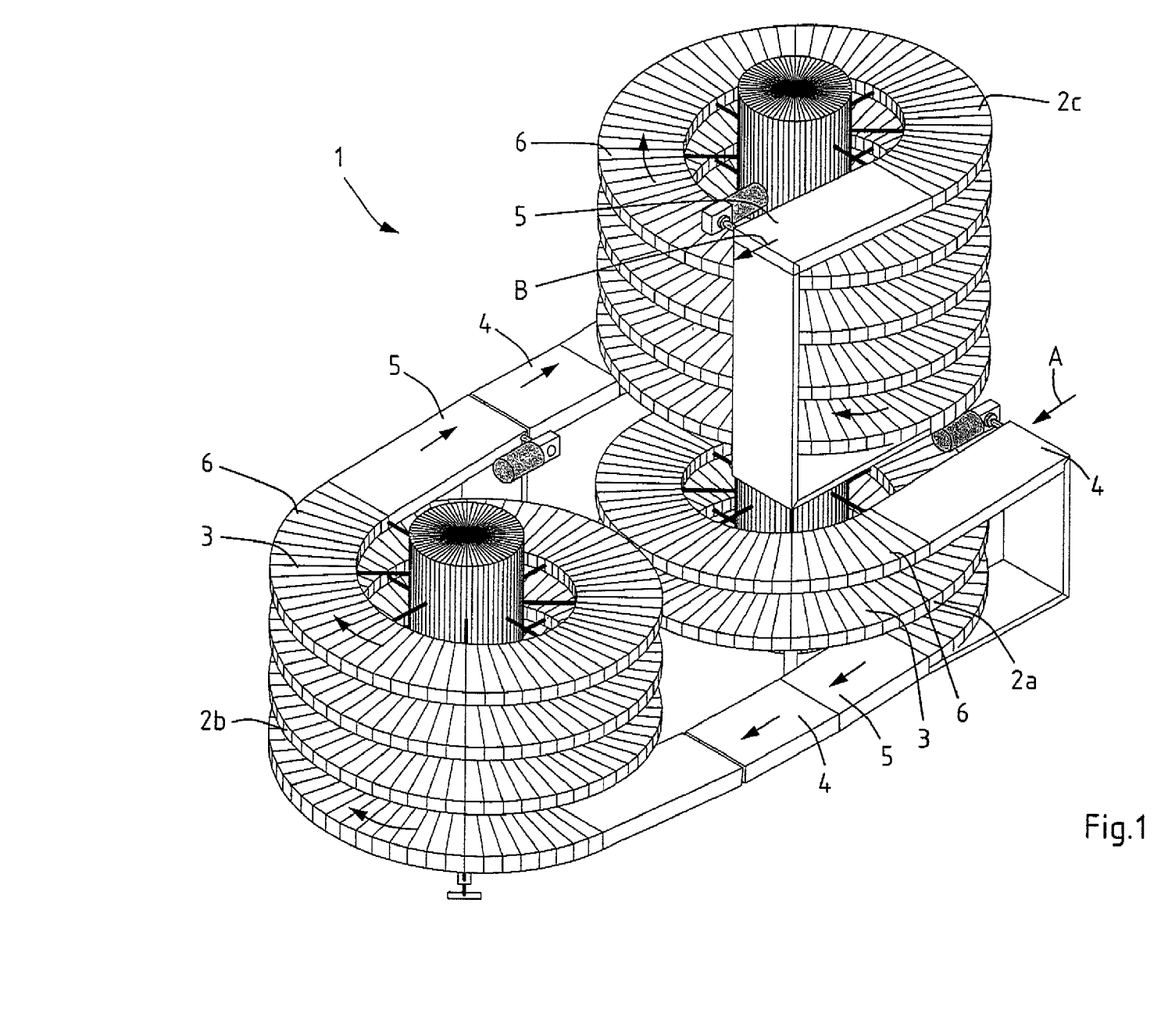
FIG. 1 is a perspective view of an embodiment of an apparatus for buffering products.

FIG. 1 shows an embodiment of an apparatus 1 according to the present invention for buffering products. This embodiment comprises three buffer conveyors 2 arranged in series, which each describe a spiral conveying path. The buffer conveyors 2 are each provided with a drivable endless conveyor belt 6. The individual conveyor belts 6 can be driven independently of each other by a drive such as electric motors, so that the buffer conveyors 2 may have mutually different conveying velocities. The most upstream buffer conveyor 2 is the first buffer conveyor 2a, and the most downstream buffer conveyor 2 is the last buffer conveyor 2c. The buffer conveyor 2 disposed between the first buffer conveyor 2a and the last buffer conveyor 2c is an intermediate conveyor, which is indicated at 2b in FIGS. 1 and 2.

The first buffer conveyor 2a can be connected to supply device, such as a supply conveyor (not shown), for supplying the products. The direction in which the products are supplied from the supply device is indicated by the arrow A in FIGS. 1 and 2. The last buffer conveyor 2c can be connected to the discharge device, such as a discharge conveyor (not shown), for discharging the products. The direction in which the products are discharged is indicated by the arrow B in FIGS. 1 and 2. The products enter the apparatus 1 at the buffer conveyor 2a, as is indicated by the arrow A, and leave the buffer conveyor 2a at the bottom side thereof. The products are subsequently transferred to the buffer conveyor 2b at the bottom side thereof. The products are transported in upward direction along the spiral path of the buffer conveyor 2b and leave the buffer conveyor 2b at a specific vertical level to be transferred to the last buffer conveyor 2c. In said buffer conveyor 2c, the products are transported further in upward direction, after which the products leave the last buffer conveyor 2c, as indicated by the arrow B.

Figure 2:
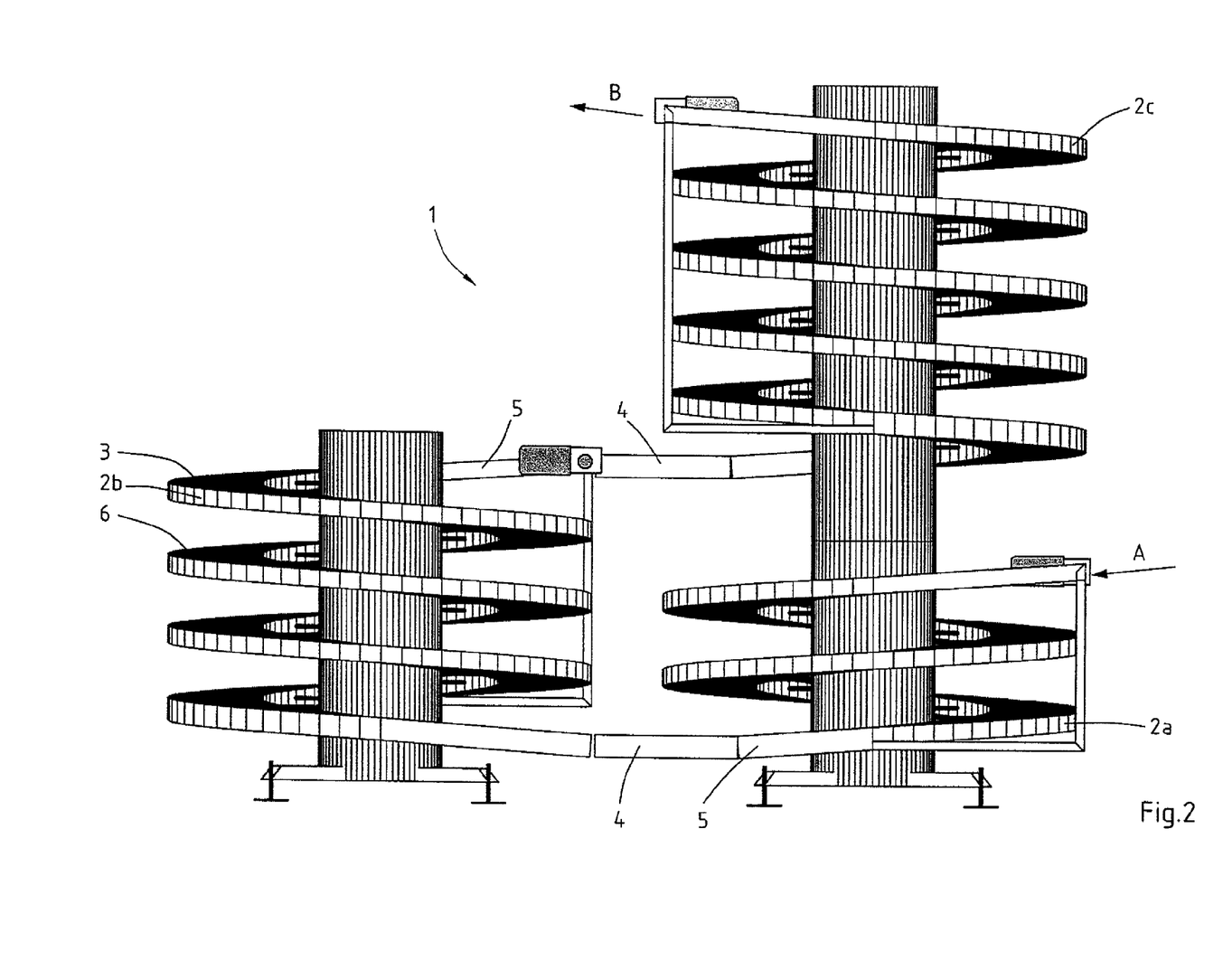
FIG. 2 is a side elevation of the embodiment of FIG. 1.

The products all follow the same conveying path via the buffer conveyors 2a, 2b and 2c (see the arrows in FIGS. 1 and 2). This means that the products need not be guided along parallel paths via abrupt direction changes, which renders the apparatus 1 very suitable for conveying and buffering products which are not very stable. The fact is that such products are sensitive to rapid direction changes, which may cause them to fall over.

In order to further increase the stability, the buffer conveyors 2 have a support surface 3 for supporting the products, which is made of a rigid material. For the spiral buffer conveyors 2, said rigid material may consist of rigid slats, which are connected to a driven endless driving element, such as a chain.

The spiral buffer conveyors 2 of the embodiment shown in FIGS. 1 and 2 each have a central axis. The central axes of the first buffer conveyor 2a and the intermediate conveyor 2b extend parallel to each other, whilst those of the first buffer conveyor 2a and the last buffer conveyor 2c coincide. The last buffer conveyor 2c is positioned above the first buffer conveyor 2a in this case, and said two buffer conveyors 2a, 2c adjoin one another in the direction of the central axes thereof. It stands to reason that many alternative arrangements of the buffer conveyors 2 are conceivable. It is also possible to use more than three buffer conveyors 2 arranged in series, which leads to an increased buffering flexibility. In practice, stacking the spiral buffer conveyors 2 has been found to be very efficient, because distribution centers generally have much space in vertical direction.

FIG. 1 also shows that the buffer conveyors 2 have an inlet end 4 and an outlet end 5. Said ends are connected in such a manner that a smooth transition between the buffer conveyors 2 is obtained. In this embodiment, the support surface 3 at each outlet end 5 is located at least substantially at the same vertical level as the inlet end 4 of the downstream buffer conveyor 2, whilst the products do not need to describe a sharp bend at the transition between conveyors 2 connecting to each other, because the outlet end 5 is in line with the inlet end 4 of the downstream buffer conveyor 2.

In practice the apparatus 1 can operate as follows:
    a predetermined number of products supplied from the supply device are received in series on the first buffer conveyor 2a (indicated by the arrow A),
    the number of products received on the first buffer conveyor 2a are then discharged in series to a downstream empty buffer conveyor 2b,
    following that, said number of products are discharged in series to a next downstream empty buffer conveyor, until said number of products have arrived on the last buffer conveyor 2c (in this embodiment the next downstream buffer conveyor is already the last buffer conveyor 2c), and said number of products of the last buffer conveyor 2c are subsequently transported in series to the discharge device. By following this method, products present on the last buffer conveyor 2c are ready for being discharged to the discharge device, whilst the process of supplying products at the supply side can continue independently of the discharging process.

In principle the first buffer conveyor 2a does not receive any products from the supply device during the discharge of the number of products received on the first buffer conveyor 2a to the downstream empty buffer conveyor 2b. Thus, separate product trains are passed on to the next buffer conveyors. In practice it appears to be advantageous to transfer complete product trains from a filled buffer conveyor 2 to a completely empty buffer conveyor 2 and not to fill the emptied buffer conveyor 2 until it has been completely emptied.

It is possible, however, to transport products from the supply device to the first buffer conveyor 2a during the discharge of a product train to the downstream buffer conveyor 2b, so long as the transfer of products from the first buffer conveyor 2a to the downstream buffer conveyor 2b—after the last product of the product train has been transferred to the buffer conveyor 2b—is stopped if the intermediate conveyor 2b has not started to discharge to the last buffer conveyor 2c or is preferably already empty, so that no mixing of product trains will occur.

The filling of the first buffer conveyor 2a preferably takes place in steps, so that the products of a product train will be spaced as close together as possible. In this way a maximum filling degree is achieved. This also means, therefore, that the speed of the first buffer conveyor 2a is zero when no products are being supplied from the supply device (and the first buffer conveyor 2a need not be driven for transferring products to the downstream buffer conveyor 2b, of course). The same goes for the last buffer conveyor 2c and the need for supplying products by the discharge side. In practice, the first buffer conveyor 2a is driven at least substantially at the same speed as the speed at which the products are supplied by the supply device, and the last buffer conveyor is driven at least substantially at the same speed as the speed at which the products are discharged by the discharge device.

It is conceivable for the speed to vary with each buffer conveyor 2. During transport of the products from the supply device to the first buffer conveyor 2a, the speed of the supply device is preferably maintained, whilst the speed is increased when the products are being moved from the first buffer conveyor 2a to the downstream buffer conveyor 2b so as to transfer the product train present on the first buffer conveyor 2a as quickly as possible to the downstream conveyor 2b, in order that the period during which the supply of products from the supply device to the first buffer conveyor 2a is stopped will be as short as possible.

In practice a number of apparatus 1 may be arranged in parallel. It is possible, for example, for a number of parallel apparatus 1 to be disposed between pallet de-stackers, which are arranged in parallel and which supply products to the individual supply conveyors 2a, and one or more pallet stackers, which receive the products from the individual discharge conveyors and stack them on pallets (not shown). At each of the pallet de-stackers, one type of products is removed from a pallet, for example, and moved to one of the first buffer conveyors 2a. Because of the parallel arrangement of the apparatus 1, each apparatus 1 can handle one type of product, but the types of products may vary for each individual apparatus, for example. At each of the pallet stackers, products from the individual last buffer conveyors 2c are collected and stacked on pallets, so that pallets carrying more than one type of product are formed. In practice this process is often referred to as "commissioning goods", which comprises the de-stacking of mono pallets (carrying only one type of product) to form bond pallets (carrying a diversity of products).

FIGS. 1 and 2 show that the buffer conveyors 2 do not all have the same dimension. In practice, however, a conveyor which in fact forms part of the last buffer conveyor 2c will frequently connect to the outlet end 5 of the last buffer conveyor 2c, so that the buffer conveyors 2 will effectively have the same capacity.

From the foregoing it will be apparent that the apparatus is relatively simple and compact and, in addition, suitable for buffering and transporting products which are not very stable. Furthermore it will be apparent that the method according to the invention provides an efficient manner of buffering.

Figure 3:
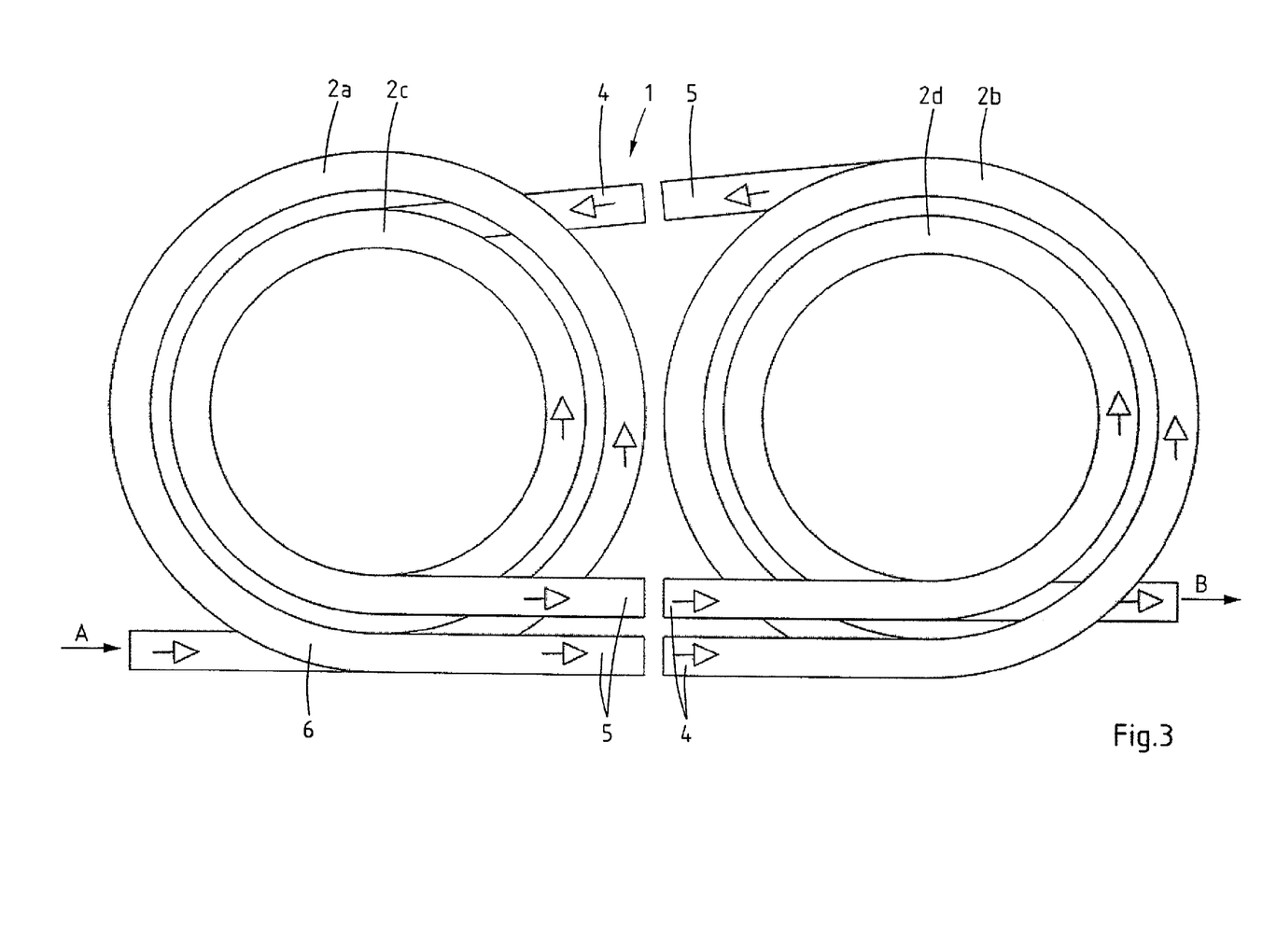
FIG. 3 is a top plan view of an alternative embodiment of the apparatus.

FIG. 3 shows a top plan view of an alternative embodiment of the apparatus 1. This embodiment comprises four buffer conveyors 2a, 2b, 2c, 2d, which are arranged in series. The arrows in FIG. 3 indicate the direction of the conveying path followed by the conveyor belts 6. The first buffer conveyor 2a extends concentrically around the buffer conveyor 2c, and the last conveyor 2d extends concentrically within the buffer conveyor 2b. In this case two intermediate conveyors 2b and 2c are provided. The products are first transported in upward direction in the buffer conveyor 2a and subsequently transferred to the next buffer conveyor 2b. The products enter the buffer conveyor 2b at the upper side and subsequently move in downward direction, leaving the buffer conveyor 2b at the bottom side thereof. The products subsequently enter the buffer conveyor 2c at the bottom side thereof to be transported in upward direction. Following that, the products enter the last buffer conveyor 2d at the upper side and follow the spiral path thereof in downward direction, after which the products can leave the apparatus 1, as indicated by the arrow B.

The invention is not limited to the embodiments as described above and shown in the drawings, which can be varied in several ways without departing from the scope of the invention. It is conceivable, for example, that only one or two buffer conveyors comprise a spiral path. The buffer conveyors may also comprise parallel paths for transporting several product trains in parallel through the apparatus. Nor is the apparatus limited to the use thereof in a palletisation and de-palletisation process, but it is also suitable for separating the supply and discharge of products by buffering in all kinds of other processes, such as production processes in which the production rate may temporarily differ from the rate at which produced products are taken off.

Figure 4:
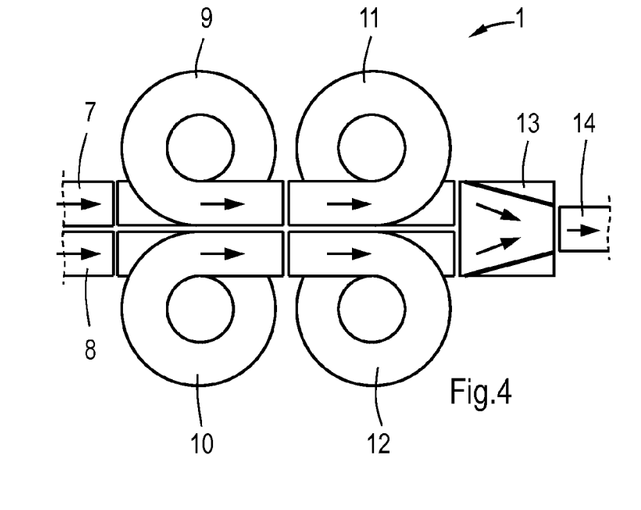
FIG. 4 is a highly schematic top plan view of an alternative embodiment of the apparatus.

FIG. 4 shows a very schematic top plan view of an alternative embodiment of the apparatus for transporting and buffering products. The embodiment of the apparatus 1 comprises supply device 7 and second supply device 8. The products, which are supplied independently of each other by the first and the second supply devices 7, 8 are transported to a front buffer conveyor 9 and a second front buffer conveyor 10, respectively. The products are then transported from the front buffer conveyor 9 to a rear buffer conveyor 11, and from the second front buffer conveyor 10 to a second rear buffer conveyor 12. The products are transported to central discharge device 13 and may be transported from there to a next conveyor 14. With this apparatus 1, products are discharged in series in a discontinuous manner, but they are supplied at least substantially continuously. The conveying velocity may be constant during periods when products are being discharged, but the conveying velocity at the location of the discharge device 13 is higher than that at the location of the supply device 7 and the second supply device 8.

In use, products are transported at least substantially continuously from the supply device 7 to the front buffer conveyor 9 and from the front buffer conveyor 9 to the rear buffer conveyor 11. The front buffer conveyor 9 is to that end driven at a specific speed. After some time, the products will arrive at the rear buffer conveyor 11, which will transport the products further. The rear buffer conveyor 11 may be a conveyor which can be driven in steps, for example, or a dynamic buffer. The term "dynamic buffer" is understood to mean that the conveyor can vary the number of products being transported or buffered as soon as a difference arises between the supply rate and the discharge rate. The spacing between successive products on a conveyor may be changed, for example. Thus it is possible to buffer the products with a minimum spacing between them (no space or a limited space). In practice such a dynamic buffer may be a conveyor belt, for example, which will continue to move under the products when the products touch one another, or a so-called "line shaft conveyor" comprising a roller track, in which the roller drive will start to slip as soon as the products touch one another.

In use, a series of products is buffered by the front and the rear buffer conveyor 9, 11 because products are continuously supplied. Said series of products is transported from the rear buffer conveyor 11 to the discharge device 13 within a predetermined period of time and at a predetermined point in time. This happens at a relatively high speed in comparison with the speed at the location of the supply device. In the meantime, the supply of products from the supply device 7 to the front buffer conveyor 9 continues uninterruptedly.

The same process takes place with a second series of products on the side of the second supply device 8, the second front buffer conveyor 10 and the second rear conveyor 12, which second series of products are likewise transported to the discharge device 13. In practice the apparatus 1 will be controlled in such a manner that the first and the second series of products are transported in succession to the discharge device. Incidentally, the apparatus 1 according to the invention is not limited to the embodiment comprising two parallel conveying paths as shown in FIG. 4, it is also possible, of course, to use more than two parallel paths.

In practice, the front buffer conveyor 9 may have a larger buffering capacity than the rear buffer conveyor 11. The rear buffer conveyor 11 may be regarded as a kind of overflow of the front buffer conveyor 9. The required absolute dimension of the buffer conveyors 9-12 depends on the conveying velocity at the supply devices 7, 8, the discharge device 13 and the buffer conveyors 9-12, and on the buffering capacity of the buffer conveyors 9-12.

A palletisation apparatus may for example be disposed at the discharge device 13. The products are supplied continuously at the location of the supply device 7 and palletised per series in a short time at the location of the discharge device 13. The front buffer conveyor 9 is driven at a continuous speed during a buffering period, so that the products are transported in the direction of the rear buffer conveyor 11, with a specific spacing between them. At said rear buffer conveyor 11, some of the products are buffered until a complete series of products is to be transported to the discharge device 13. A part (generally a small part) of said series is located at the rear buffer conveyor 11, and another part is located at the front buffer conveyor 9. To transport the series 2 to the discharge device 13 at a relatively high speed, the speed of the front buffer conveyor 9 is increased during a discharge period, so that the products of the series can be quickly transported to the discharge device 13 via the rear buffer conveyor 11.

In the meantime, the products are transported in the direction of the rear buffer conveyor 11 with a larger spacing between them by the front buffer conveyor 9 because of the continuous supply of products at the supply device 7 and the increased speed of the front buffer conveyor 9. After a series of products has been discharged, the conveying velocity of the front buffer conveyor 9 can be decreased again, so that the spacing between the products at the location of the front buffer conveyor 9 will become smaller again. As soon as the products on the front buffer conveyor 9 arrive at the rear buffer conveyor 11, said products are buffered thereon with a minimum spacing between them again.

Figure 5:
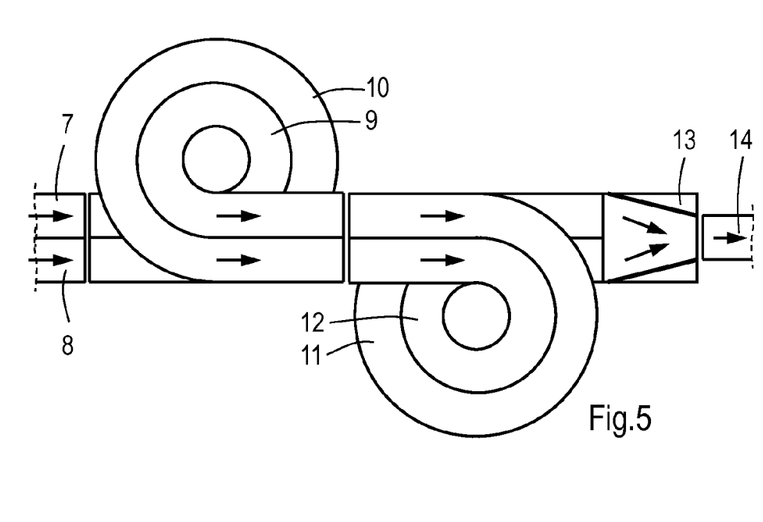
FIG. 5 is a view corresponding to FIG. 4 of another alternative embodiment.
Figure 6:
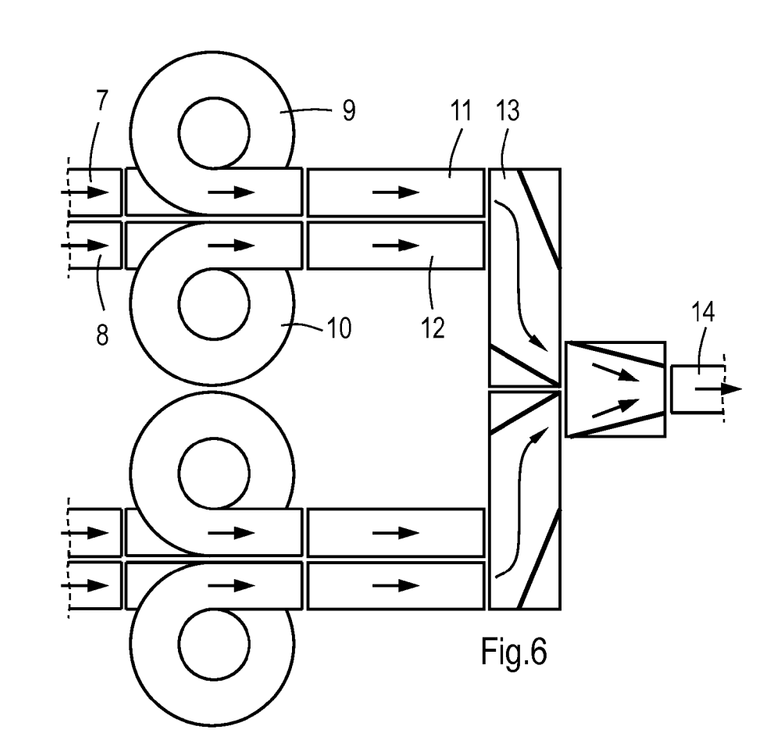
FIG. 6 is a view corresponding to FIG. 4 of yet another alternative embodiment.

As shown in FIG. 4, the buffer conveyors 9-12 describe a spiral path. Many alternative configurations are possible, however. Alternative embodiments are shown in FIGS. 5 and 6. In the embodiment shown in FIG. 6, the apparatus comprises four supply devices and one discharge conveyor 14. One discharge device 13 is indicated, at which the products are received from two parallel conveyors.

Figure 7:
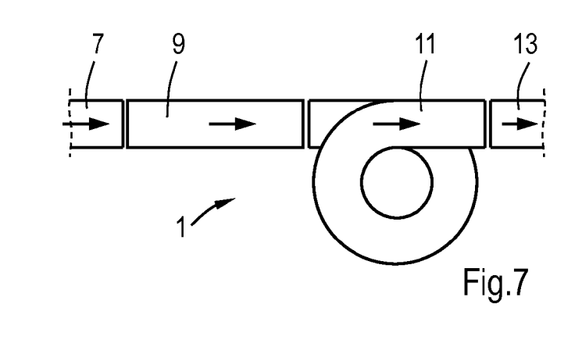
FIG. 7 is a view corresponding to FIG. 4 of yet another alternative embodiment.

FIG. 7 shows an alternative embodiment of the apparatus 1. In this embodiment, the buffering capacity of the front buffer conveyor 9 is smaller than that of the rear buffer conveyor 11. The front buffer conveyor 9 is a dynamic buffer in this embodiment. The rear buffer conveyor 11 is spiral-shaped, but an alternative configuration is also possible; also the front buffer conveyor 9 may be spiral-shaped, if desired. The rear buffer conveyor 11 is the main buffer in this embodiment, which buffers the products from the front conveyor 9 with a minimum spacing between them.

The rear buffer conveyor 11 will operate at an increased speed during the discharge of a series of products from the rear conveyor 11 to the discharge device 13, and only the front buffer conveyor 9 will buffer the products. No products are transported from the front conveyor 9 to the rear conveyor 11 during said discharge, therefore. This is for example possible if the front buffer conveyor 9 is a dynamic buffer. In this way the rear buffer conveyor 11 is emptied first before a new series of products is admitted from the first buffer conveyor 9.

After a series of products has been discharged from the rear buffer conveyor 11, products are transported from the front buffer conveyor 9 to the rear buffer conveyor 11 again and buffered at the rear buffer conveyor 11 with a minimum spacing between them. In the meantime, the supply of products from the supply device 7 to the front buffer conveyor 9 continues normally.

The invention claimed is:

1. An apparatus for buffering products, comprising at least three buffer conveyors arranged in series, which are configured to be driven independently of each other, a first buffer conveyor connectable to a supply device and a last buffer conveyor connectable to a discharge device, wherein the buffer conveyors include a drivable endless conveyor belt and that said buffer conveyors are so arranged that each of the products follows the same conveying path and at least one of the buffer conveyors comprises a spiral path.

2. The apparatus according to claim 1, wherein the buffer conveyors jointly comprise a single conveying path, which is made up of each of the endless conveyor belts of the buffer conveyors.

3. The apparatus according to claim 1, wherein each buffer conveyor comprises an at least substantially flat drivable support surface configured to support and transport the products, which support surface is made of a rigid material so as to form a stable surface for the products.

4. The apparatus according to claim 1, wherein the apparatus comprises at least three spiral buffer conveyors.

5. The apparatus according to claim 1, wherein at least two spiral buffer conveyors are provided, whose central axes extend at least substantially parallel to each other or coincide.

6. The apparatus according to claim 5, wherein the spiral buffer conveyors adjoin each other in the direction of the central axes thereof.

7. The apparatus according to claim 1, wherein each of the buffer conveyors comprises an inlet end and an outlet end, which are connected to the outlet end and the inlet end of the upstream buffer conveyor and the downstream buffer conveyor, respectively, in such a manner that a smooth transition between the buffer conveyors is obtained.

8. The apparatus according to claim 1, wherein said supply device and/or said discharge device are a supply conveyor and/or a discharge conveyor.

9. The apparatus according to claim 1, wherein the apparatus comprises at least two spiral buffer conveyors.

10. The apparatus according to claim 9, wherein the conveying path of one buffer conveyor extends in an upward direction and the conveying path of the other buffer conveyor extends in a downward direction.

11. The apparatus according to claim 1, wherein the endless conveyor belt extends from one end of the spiral buffer conveyor along the outer side of the spiral path to an inlet end of the spiral buffer conveyor so as to take the shortest route from the outlet end to the inlet end.

12. An apparatus for transporting and buffering products, comprising at least one supply device, a front buffer conveyor, a rear buffer conveyor arranged downstream of said front buffer conveyor, and a discharge device, wherein the apparatus is so arranged that, in use, the products are at least substantially continuously transported from the supply device to the front buffer conveyor and from the front buffer conveyor to the rear buffer conveyor, so that a series of products is buffered by the front buffer conveyor and/or the rear buffer conveyor, after which said series of products is at least substantially continuously transported from the rear buffer conveyor to the discharge device within a predetermined period of time, wherein the conveying velocity at the discharge device is higher than the conveying velocity at the supply device, whilst the supply of products from the supply device to the front buffer conveyor continues uninterruptedly during the discharge of the series of products to the discharge device.

13. The apparatus according to claim 12, wherein the rear buffer conveyor is so arranged that the products are buffered with a minimum spacing between them at the rear buffer conveyor.

14. The apparatus according to claim 12, wherein the front buffer conveyor has a larger buffering capacity than the rear buffer conveyor.

15. The apparatus according to claim 12, wherein at least the front buffer conveyor comprises a spiral path.

16. The apparatus according to claim 12, wherein the apparatus is so arranged that the transport of products from the front buffer conveyor to the rear buffer conveyor is interrupted during the time products are being discharged to the discharge device.

17. The apparatus according to claim 16, wherein the front buffer conveyor has a smaller buffering capacity than the rear buffer conveyor.

18. The apparatus according to claim 12, wherein the apparatus comprises at least a second supply device, a second front buffer conveyor, and a second rear buffer conveyor connected downstream of the second front buffer conveyor, wherein the apparatus is so arranged that, in use, the products are transported at least substantially continuously from the second supply device to the second front buffer conveyor and from the second front buffer conveyor to the second rear buffer conveyor, so that a second series of products is buffered by the second front buffer conveyor and/or the second rear buffer conveyor, wherein said second series of products is transported at least substantially continuously from the second rear buffer conveyor to the discharge device within a predetermined period of time, wherein the conveying velocity at the discharge device is higher than the conveying velocity at the second supply device, whilst the supply of products from the second supply device to the second front buffer conveyor continues uninterruptedly during the discharge of the second series of products.

19. The apparatus according to claim 18, wherein the apparatus is so arranged that the discharge of the second series of products from the second rear buffer conveyor to the discharge device occurs after discharge of the first series of products from the rear buffer conveyor to the discharge device.

* * * * *